US011131975B2

(12) United States Patent
Ishizaka

(10) Patent No.: US 11,131,975 B2
(45) Date of Patent: Sep. 28, 2021

(54) AIR CONDITIONING SYSTEM AND COMMUNICATION METHOD FOR WIRED AND WIRELESS MESSAGE TRANSMISSION

(71) Applicant: Mitsubishi Electric Corporation, Tokyo (JP)

(72) Inventor: Taichi Ishizaka, Tokyo (JP)

(73) Assignee: Mitsubishi Electric Corporation, Tokyo (JP)

( * ) Notice: Subject to any disclaimer, the term of this patent is extended or adjusted under 35 U.S.C. 154(b) by 0 days.

(21) Appl. No.: 16/493,335

(22) PCT Filed: Jun. 12, 2017

(86) PCT No.: PCT/JP2017/021600
§ 371 (c)(1),
(2) Date: Sep. 12, 2019

(87) PCT Pub. No.: WO2018/229814
PCT Pub. Date: Dec. 20, 2018

(65) Prior Publication Data
US 2020/0133219 A1    Apr. 30, 2020

(51) Int. Cl.
*G05B 19/042*    (2006.01)
*H04B 1/38*    (2015.01)
(Continued)

(52) U.S. Cl.
CPC ........... *G05B 19/042* (2013.01); *F24F 11/30* (2018.01); *F24F 11/56* (2018.01); *H04B 1/38* (2013.01);
(Continued)

(58) Field of Classification Search
CPC ........... G05B 19/042; G05B 2219/2614; F24F 11/30; F24F 11/56; F24F 11/54;
(Continued)

(56) References Cited

U.S. PATENT DOCUMENTS 9,432,802 B2 *    8/2016    Matsushita ............. H04W 4/02
9,654,434 B2 *    5/2017    Sone ................... H04L 12/2829
(Continued)

FOREIGN PATENT DOCUMENTS

CN    101189828 A    5/2008
JP    2001-280674 A    10/2001
(Continued)

OTHER PUBLICATIONS

Office Action dated Sep. 15, 2020 issued in corresponding JP patent application No. 2019-524552 (and English translation).
(Continued)

*Primary Examiner* — Ramesh B Patel
(74) *Attorney, Agent, or Firm* — Posz Law Group, PLC

(57) ABSTRACT

A wireless terminal performs communication setting processing in response to connection processing from an air conditioning management apparatus. The air conditioning management apparatus sends, to a wireless terminal, a wireless communication electronic message in which an air conditioning communication electronic message is packaged. Upon receipt of the wireless communication electronic message, the wireless terminal converts the content of the communication. Upon receipt of the air conditioning communication electronic message, an air conditioner executes a request command described in the air conditioning communication electronic message. Upon receipt of the air conditioning communication electronic message, the wireless terminal converts the content of the communication. Upon receipt of the wireless communication electronic message, the air conditioning management apparatus performs response reception processing.

6 Claims, 6 Drawing Sheets

(51) Int. Cl.
*F24F 11/30* (2018.01)
*F24F 11/56* (2018.01)
*H04W 84/04* (2009.01)

(52) U.S. Cl.
CPC ..... *G05B 2219/2614* (2013.01); *H04W 84/04* (2013.01)

(58) Field of Classification Search
CPC .......... F24F 11/63; H04B 1/38; H04W 84/04; H04W 84/12
See application file for complete search history.

(56) References Cited

U.S. PATENT DOCUMENTS

| | | | | |
|---|---|---|---|---|
| 10,082,309 | B2* | 9/2018 | Castillo | H04L 12/283 |
| 10,410,300 | B2* | 9/2019 | Bentz | G07F 17/0014 |
| 10,584,892 | B2* | 3/2020 | Sasaki | F24F 11/64 |
| 2001/0048376 | A1* | 12/2001 | Maeda | F24F 11/30 340/870.17 |
| 2004/0010347 | A1* | 1/2004 | Yamanashi | F24F 11/30 700/276 |
| 2004/0117069 | A1 | 6/2004 | Yoon et al. | |
| 2004/0204793 | A1* | 10/2004 | Yoon | F24F 11/62 700/277 |
| 2006/0067344 | A1 | 3/2006 | Sakurai | |
| 2006/0268794 | A1 | 11/2006 | Sekhar | |
| 2012/0053738 | A1* | 3/2012 | Lingrey | F24F 11/30 700/278 |
| 2014/0004879 | A1* | 1/2014 | Matsushita | H04W 4/029 455/456.1 |
| 2015/0128618 | A1* | 5/2015 | Park | F24F 11/30 62/56 |
| 2016/0102878 | A1* | 4/2016 | Smith | H04W 12/04 700/276 |
| 2017/0045864 | A1* | 2/2017 | Fadell | F24F 11/30 |

FOREIGN PATENT DOCUMENTS

| | | |
|---|---|---|
| JP | 2004-028384 A | 1/2004 |
| JP | 2005-005869 A | 1/2005 |
| JP | 2006-108823 A | 4/2006 |
| JP | 2009-010977 A | 1/2009 |
| JP | 2016-152611 A | 8/2016 |
| WO | 2006/130587 A1 | 12/2006 |

OTHER PUBLICATIONS

Office Action dated Sep. 17, 2020 issued in corresponding CN patent application No. 201780090735.X (and partial English translation).
International Search Report dated Jul. 11, 2017 issued in the corresponding International Application No. PCT/JP2017/021600 (and English translation).
Office Action dated May 12, 2020 issued in corresponding JP patent application No. 2019-524552 (and English translation).
Extended European Search Report dated Oct. 2, 2020 issued in corresponding EP patent application No. 17913655.1.
Office Action (Reconsideration Report by Examiner before Appeal) dated Dec. 15, 2020 issued for the corresponding JP patent application No. 2019-524552 (and English translation).
Chinese Office Action dated Mar. 17, 2021 Issued for the corresponding CN patent application No. 201780090735.X (and English translation).
Office Action dated Aug. 3, 2021, issued in corresponding JP Patent Application No. 2019-524552 (and English Machine Translation).

* cited by examiner

AIR CONDITIONING SYSTEM AND COMMUNICATION METHOD FOR WIRED AND WIRELESS MESSAGE TRANSMISSION

CROSS REFERENCE TO RELATED APPLICATION

This application is a U.S. national stage application of PCT/JP2017/021600 filed on Jun. 12, 2017, the contents of which are incorporated herein by reference.

TECHNICAL FIELD

The present disclosure relates to an air conditioning system and a communication method.

BACKGROUND ART

Air conditioners are installed heretofore in structures such as office buildings, schools and hospitals. In recently years, an air conditioning management apparatus for integrated management of such air conditioners is commonly installed in a structure. For example, an air conditioning management apparatus installed in an office building enables a building manager to collectively monitor and control operating states of air conditioners installed in the office building.

For connections among an air conditioning management apparatus and air conditioners, a dedicated communication line for the air conditioners is used. To enable low-cost installation, such a dedicated communication line commonly includes a communication circuit that has a limit (upper limit) for the number of air conditioners connectable. The maximum number of air conditioners connectable to an air conditioning management apparatus via a dedicated communication line is, for example, limited to 50-64. Thus, in a large-scale structure in which air conditioners in excess of the maximum number are arranged, a plurality of the dedicated communication lines is used, and air conditioning management apparatuses are arranged corresponding to the dedicated communication lines. In the present disclosure, a plurality of air conditioners connected to the same dedicated communication line is termed an "air conditioner group".

In the case of performing collective management of air conditioner groups that are connected to different dedicated communication lines, air conditioning management apparatuses are connected to one another via a general-purpose communication network such as a LAN to enable intercommunication. Thus, management of the air conditioner groups can be appropriately achieved by a representative air conditioning management apparatus or an administrative personal computer that is connected to the general-purpose communication network.

Patent Literature 1 discloses a technique of a remote monitoring system for management of such air conditioner groups from a distance. This remote monitoring system, which performs management of air conditioner groups (a plurality of air conditioners) installed respectively in different buildings, comprises data collectors, each installed in the corresponding building, and a remote monitor. Each of the data collectors and the remote monitor are connected via a wireless communication network. Each of the data collectors collects state data indicating operating state of the air conditioners installed in the corresponding building and transmits the collected state data to the remote monitor via a wireless communication. Such configuration of the remote monitoring system of Patent Literature 1 enables collective management of states of the plurality of air conditioners.

CITATION LIST

Patent Literature

Patent Literature 1: Unexamined Japanese Patent Application Kokai Publication No. 2001-280674

SUMMARY OF INVENTION

Technical Problem

As described above, the remote monitoring system of Patent Literature 1 includes the data collectors that transmit the state data to the remote monitor via wireless communication. In conventional air conditioning systems represented by such a remote monitoring system, data collectors and a remote monitor are usually connected via wireless communication.

However, such a data collector is to be a device for performing management of air conditioner groups, and thus is to have a certain level of high functionality. That is to say, for performing management of air conditioners such as outdoor units and indoor units, a data collector is to be a device that includes a processor having high processing capacity, a memory to store collected data, and a communication device capable of wireless and wired communication, resulting in a costly device.

Such a data collector is to be prepared for each predetermined number of air conditioners, and thus such configuration suffers from high installation cost for conventional air conditioning systems.

The present disclosure has been made in view of the foregoing circumstances, and an objective of the disclosure is to provide an air conditioning system that enables collective management of air conditioners in a system while curbing increase in installation cost.

Solution to Problem

To attain the aforementioned objective, an air conditioning system of the present disclosure includes:

an air conditioner connected to a wired transmission line;

a wireless terminal connected to the wired transmission line; and an air conditioning management apparatus configured to control the air conditioner, wherein the air conditioner sends and receives a first electronic message to and from the wireless terminal, the wireless terminal sends and receives the first electronic message to and from the air conditioner, and converts the first electronic message received into a second electronic message, and wirelessly sends and receives the second electronic message to and from the air conditioning management apparatus, and the air conditioning management apparatus comprises wireless communication management means for recovering, from the second electronic message received, the first electronic message sent by the air conditioner, and converting the first electronic message that is to be sent to the air conditioner into the second electronic message, and sending the second electronic message to the wireless terminal.

Advantageous Effects of Invention

According to the present disclosure, the wireless terminal is connected to the wired transmission line connected to the air conditioner, and the air conditioning management apparatus communicates with the wireless terminal via a wireless transmission line. Such a configuration eliminates the need for connecting directly the air conditioning management apparatus with the air conditioner via the wired transmission line, and also eliminates the need for preparing a plurality of air conditioning management apparatuses according to the number of the wired transmission lines. Furthermore, limiting the function of the wireless terminal to interconversion of communication via the wired transmission line and communication via the wireless transmission line enables restraint of the price of the terminal as compared to the conventional data collectors. Such a configuration enables collective management of the air conditioners in the system while curbing increase in installation cost.

DESCRIPTION OF EMBODIMENTS

Figure 1:
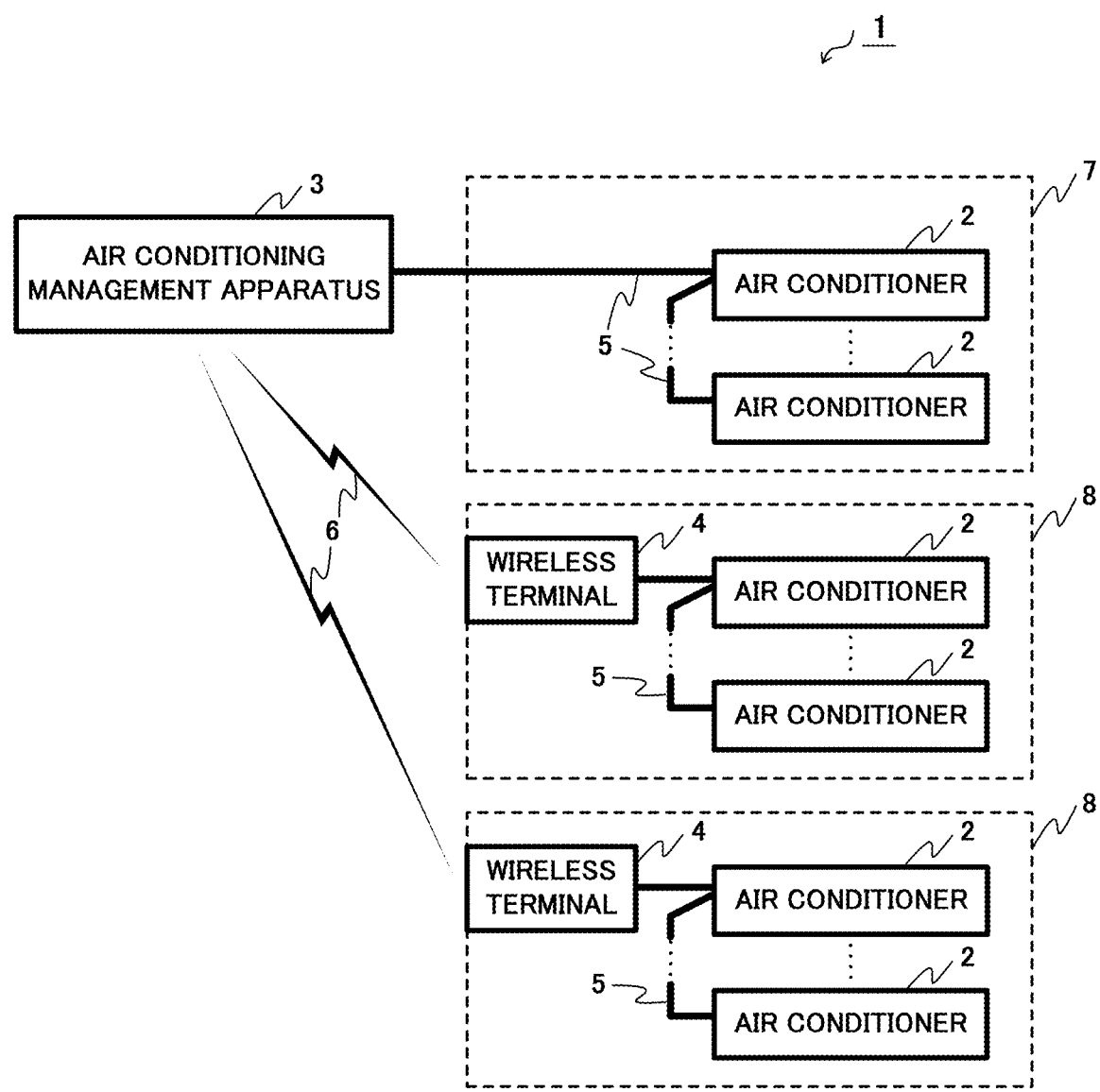
FIG. 1 illustrates an example of overall configuration of an air conditioning system according to Embodiment 1 of the present disclosure.

Embodiments of the present disclosure are described below in detail with reference to drawings. In the drawings, components that are the same or equivalent are assigned the same reference sign. Although the present disclosure is described for a case of use in an air conditioning system for controlling air conditioners, the present disclosure can also be used in a similar manner for systems for controlling other equipment described below. That is to say, embodiments for description are described below, and the below description does not limit the scope of the present disclosure. Thus, persons skilled in the art can substitute an equivalent for each or all these elements of these embodiments, and such embodiments are included in the scope of the present disclosure.

Embodiment 1

FIG. 1 illustrates an example of overall configuration of an air conditioning system 1 according to Embodiment 1 of the present disclosure. This air conditioning system 1 is a system for management of air conditioners 2 arranged in structures such as office buildings, schools and hospitals. An example of the air conditioning system 1 for management of the air conditioners 2 arranged in an office building (hereinafter referred to as a building) is described.

As illustrated, the air conditioning system 1 includes a plurality of the air conditioners 2, an air conditioning management apparatus 3, and a plurality of wireless terminals 4.

The air conditioners 2 are communicatively interconnected via a dedicated communication line 5 that is a wired transmission line. The dedicated communication line 5 has a predetermined upper limit for the number of the air conditioners 2 connectable thereto. In the air conditioning system 1 of the present disclosure, the number of the air conditioners 2 arranged in the building exceeds the upper limit, and thus a plurality of the dedicated communication lines 5 is used. A plurality of the air conditioners 2 connected to the same dedicated communication line 5 is hereinafter termed an "air conditioner group". The air conditioners 2 of the air conditioning system 1 are classified into an air conditioner group 7 and an external air conditioner group 8. The air conditioner group 7 is also connected to the air conditioning management apparatus 3 via the corresponding dedicated communication line 5, thereby enabling the air conditioning management apparatus 3 to directly communicate with the air conditioners 2 of the air conditioner group 7. The external air conditioner group 8 includes the wireless terminals 4 that are connected to the air conditioners 2 of the external air conditioner group 8 via the corresponding dedicated communication line 5. The air conditioning management apparatus 3 and the wireless terminals 4 are communicatively interconnected via a wireless communication network 6 that is a wireless transmission line.

The air conditioners 2 of the air conditioner group 7 and the external air conditioner group 8 are each arranged in a predetermined place of the building. The air conditioner 2 includes an outdoor unit and an indoor unit. The outdoor unit of the air conditioner 2 is typically installed on a roof of the building. The air conditioners 2 each operates under management by the air conditioning management apparatus 3. For example, operating states of the air conditioners 2 of the air conditioner group 7 are sent as notification to the air conditioning management apparatus 3 via the dedicated communication line 5, whereas operating states of the air conditioners 2 of the external air conditioner group 8 are sent as notification to the air conditioning management apparatus 3 through the wireless terminals 4 and via the wireless communication network 6.

Figure 2:
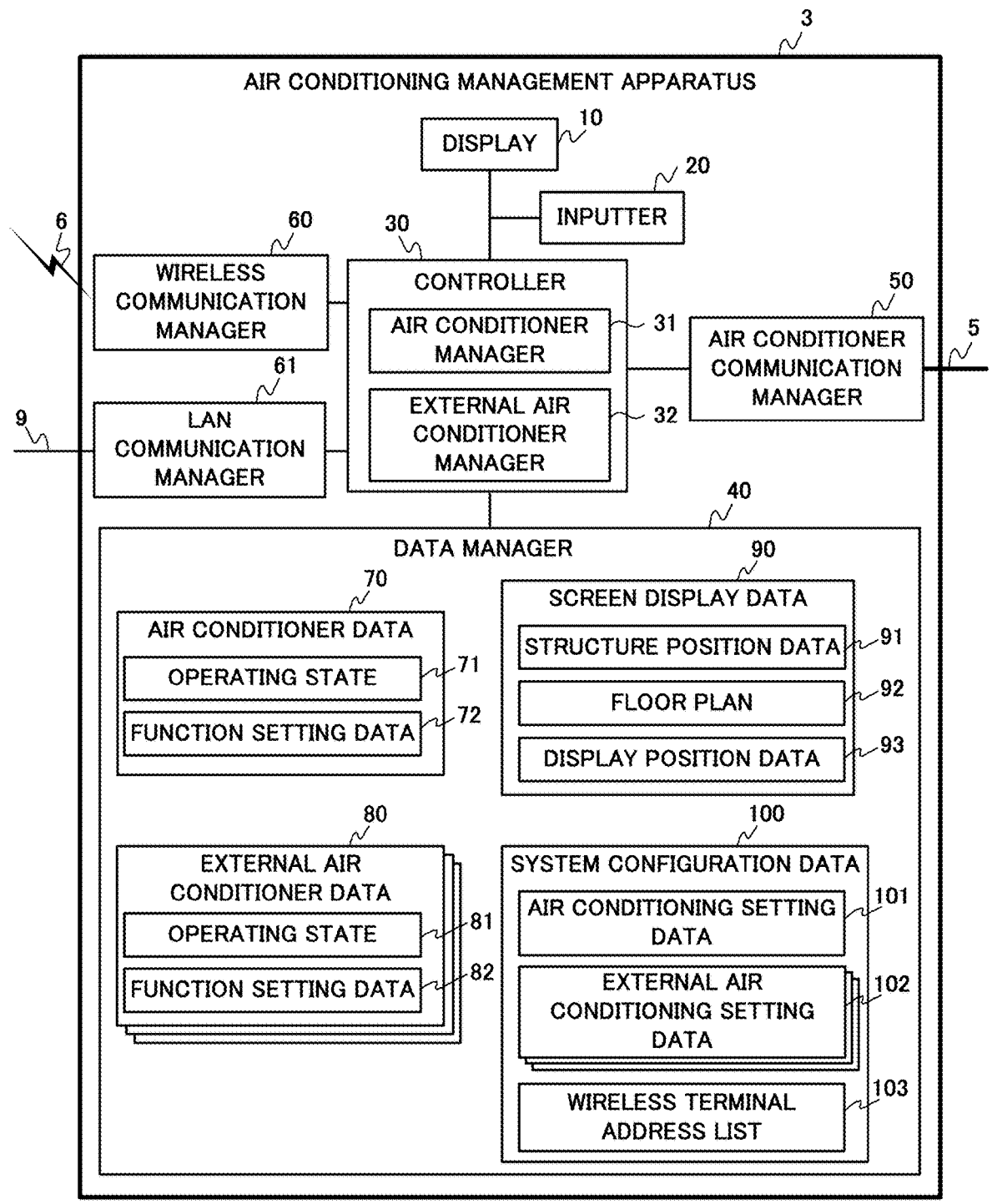
FIG. 2 is a block diagram illustrating an example of configuration of an air conditioning management apparatus according to Embodiment 1.

The air conditioning management apparatus 3 performs integrated management of the air conditioner group 7 and the external air conditioner group 8. The air conditioning management apparatus 3 is described below in detail with reference to FIG. 2. FIG. 2 is a block diagram illustrating an example of configuration of the air conditioning management apparatus 3.

As illustrated, the air conditioning management apparatus 3 includes a display 10, an inputter 20, a controller 30, a data manager 40, an air conditioner communication manager 50, a wireless communication manager 60, and a LAN communication manager 61.

The display 10 is a display device such as a liquid crystal display. The display 10 displays, in accordance with control from the controller 30, various screens for management and control of the air conditioner group 7 and the external air conditioner group 8.

The inputter 20 is an input device such as a mouse, a keyboard, and a touch panel. In the case of employing a touch panel, the touch panel is overlaid on the display 10. Upon operation of the inputter 20 by a manager, an input content of the operation is supplied to the controller 30, and then switching of the screen and sending of instructions to the air conditioner 2 or the like are performed in accordance with the input content.

The controller 30 includes a Central Processing Unit (CPU) and a memory, neither of which is illustrated. Functions of the controller 30 are achieved by the CPU executing a program stored in the memory. The controller 30 appropriately collects operating states of the air conditioner group 7 and the external air conditioner group 8, creating monitor screens based on the operating states collected. The display 10 displays the monitor screen created by the controller 30.

The controller 30 includes an air conditioner manager 31 for performing management of the air conditioner group 7 and an external air conditioner manager 32 for performing management of the external air conditioner group 8. That is to say, the air conditioner manager 31 monitors and controls the operating state of the air conditioner group 7, while the external air conditioner manager 32 monitors and controls the operating state of the external air conditioner group 8.

The data manager 40 manages various data to be used for processing performed by the controller 30, such as monitor processing and control processing of the air conditioner group 7 and the external air conditioner group 8. The data that the data manager 40 manages is broadly classified into air conditioner data 70, external air conditioner data 80, screen display data 90, and system configuration data 100.

The air conditioner data 70 includes an operating state 71 and function setting data 72 of the air conditioner group 7.

The operating state 71 is data showing current operating states of the air conditioners 2 of the air conditioner group 7, such as an operating-stopped state, an operation mode (e.g., cooling and heating), a temperature setting, and a room temperature. This operating state 71 is constantly updated to an up-to-date state by sending and receiving data to and from each of the air conditioners 2 via the dedicated communication line 5.

The function setting data 72 is setting data for various functions including scheduled operation and energy-saving operation of each of the air conditioners 2 of the air conditioner group 7. The air conditioners 2 of the air conditioner group 7 are each controlled in accordance with the function setting data 72.

The external air conditioner data 80 includes an operating state 81 and function setting data 82 of the external air conditioner group 8.

The operating state 81 and the function setting data 82, except for being data for the air conditioners 2 connected to a different dedicated communication line 5, are equivalent to the operating state 71 and the function setting data 72 described above.

The screen display data 90, which includes structure position data 91, floor plan 92, and display position data 93, is data to be used in creating the monitor screens for monitoring of the air conditioner group 7 and the external air conditioner group 8. The monitor screen, which is described in detail below, is, for example, a screen that displays on an image of a floor plan the operating states of the air conditioner group 7 and the external air conditioner group 8 using air conditioner icons for enabling a user (a manager) to easily manage the operating states.

The structure position data 91 is data that is saved for displaying on drawings or maps of the building the structures in which the air conditioners 2 and the wireless terminals 4 are installed. The structure position data 91 includes, for example, names of the structures, and latitude and longitude of each structure in which a wireless terminal is installed.

The floor plan 92 is an image displayed as a background of the monitor screen to clearly display the installation positions of the air conditioners 2 in the building. The floor plan 92 includes, for example, an image of a floor plan of each floor.

The display position data 93 is data showing, for example, floor numbers of the floors in which the air conditioners 2 are installed, and X coordinates and Y coordinates of the air conditioners 2 on the image of floor plan. The display position data 93 is used in arranging the air conditioner icons on the images of each floor plan displayed on the monitor screen. The X coordinates and Y coordinates of the display position data 93 may be expressed by ratio (ranging from 0% to 100%) with respect to vertical and horizontal size of the image of the floor plan, and the positions in which the air conditioner icons are displayed may be magnified and reduced to follow magnification and reduction of the image of the floor plan.

The system configuration data 100 is data that is set to enable management and control of the air conditioner group 7 and the external air conditioner group 8, and includes air conditioning setting data 101, external air conditioning setting data 102, and a wireless terminal address list 103.

The air conditioning setting data 101 is setting data for air conditioner group 7. The air conditioning setting data 101 includes, for example, an address number of the air conditioning management apparatus 3 on the dedicated communication line 5 and information of the air conditioners 2 of the air conditioner group 7 such as an operation group configuration, a group name, and ventilation interlocking device settings. The air conditioner manager 31 of the controller 30 performs system startup processing in accordance with the air conditioning setting data 101, enabling control of (management of) the air conditioners 2 of the air conditioner group 7.

The external air conditioning setting data 102 is setting data for the external air conditioner group 8. The external air conditioning setting data 102 includes, for example, the address number of the air conditioning management apparatus 3 connected to the external air conditioner group 8 through the wireless terminal 4 on the dedicated communication line 5 and information of the air conditioners 2 of the external air conditioner group 8 such as an operation group configuration, a group name, and ventilation interlocking device settings. That is to say, the external air conditioning setting data 102, except for being data for the air conditioners 2 connected to a different dedicated communication line 5 via the wireless terminal 4, is equivalent to the air conditioning setting data 101 described above.

The wireless terminal address list 103 includes address information for connection with each of the wireless terminals 4. The wireless communication manager 60, which is described in detail below, establishes a wireless communication line between the air conditioning management apparatus 3 and the wireless terminals 4 in accordance with the wireless terminal address list 103.

The air conditioner communication manager 50 is an interface for the dedicated communication line 5. The air conditioner manager 31 of the controller 30 controls the air conditioner communication manager 50 to send and receive data to and from the air conditioner group 7 via the dedicated communication line 5. The dedicated communication line 5 may be another configuration in which a general-purpose communication line such as a Local Area Network (LAN) and an RS-485 interface is used.

The wireless communication manager 60 is an interface for the wireless communication network 6. The external air conditioner manager 32 of the controller 30 controls the wireless communication manager 60 to send and receive data to and from the wireless terminals 4 via the wireless communication network 6. The wireless communication network 6 may be a long-range wireless network such as a Low Power, Wide Area (LPWA) communication network, long-range Wi-Fi network (IEEE 802.11ah), and specified low power wireless system. Employing such a long-range wireless network allows the wireless communication network 6 to establish a wireless communication line that enables communication between positions that are several hundred meters to several kilometers away from each other.

The LAN communication manager 61 is an interface for a LAN communication line 9. The LAN communication manager 61 is used for connection of the air conditioning system 1 with an external management personal computer or a building management device (not illustrated). Connecting via the LAN communication line 9 with, for example, a management personal computer, enables the management personal computer to perform monitoring, control, and various settings of the air conditioner group 7 and the external air conditioner group 8. The LAN communication line 9 is not limited to a wired LAN communication line and may be a wireless communication line such as a wireless LAN and Bluetooth®.

Figure 3:
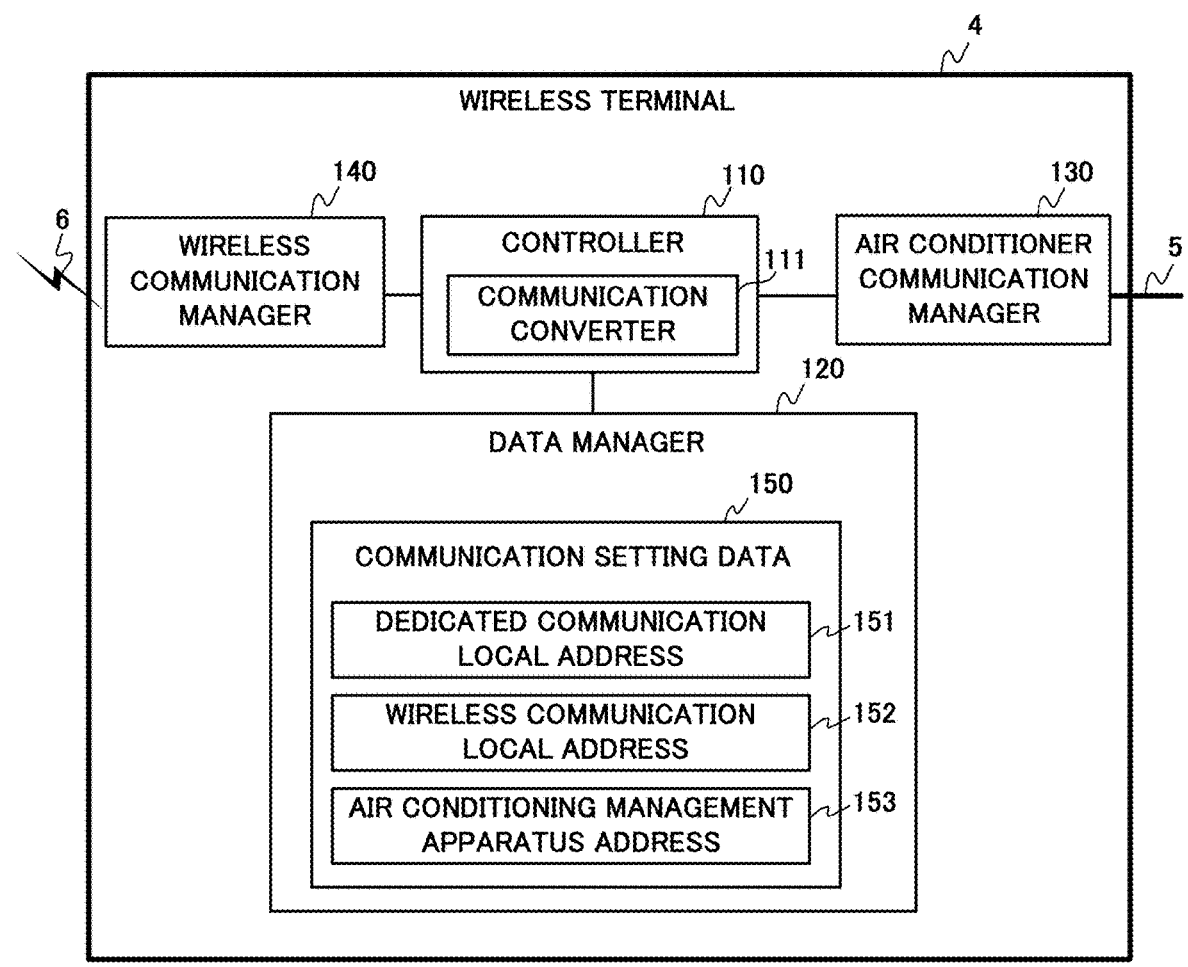
FIG. 3 is a block diagram illustrating an example of configuration of a wireless terminal according to Embodiment 1.

Referring back to FIG. 1, the wireless terminals 4 each interconverts communication from the air conditioners 2 of the corresponding external air conditioner group 8 that are connected via the dedicated communication line 5 and communication from the air conditioning management apparatus 3 that is connected via the wireless communication network 6. The wireless terminal 4 is described below in detail with reference to FIG. 3. FIG. 3 is a block diagram illustrating an example of configuration of the wireless terminal 4.

As illustrated, the wireless terminal 4 includes a controller 110, a data manager 120, an air conditioner communication manager 130, and a wireless communication manager 140.

The controller 110 includes a CPU and a memory (not illustrated). The function of the controller 110 is achieved by the CPU executing a program stored in the memory.

The controller 110 includes a communication converter 111 for interconverting communication via the dedicated communication line 5 connected to the wireless terminal 4 and communication via the wireless communication network 6.

The communication converter 111 interconverts communication from the air conditioners 2 of the external air conditioner group 8 connected to the wireless terminal 4 via the dedicated communication line 5 and communication from the air conditioning management apparatus 3 connected to the wireless terminal 4 via the wireless communication network 6. For example, upon receipt of an air conditioning communication electronic message (a first electronic message) that is sent from the air conditioners 2 via the dedicated communication line 5, the communication converter 111 converts the air conditioning communication electronic message into a wireless communication electronic message (a second electronic message), and then sends the wireless communication electronic message to the air conditioning management apparatus 3 via the wireless communication network 6. Further, upon receipt of a wireless communication electronic message that is sent from the air conditioning management apparatus 3 via the wireless communication network 6, the communication converter 111 converts the wireless communication electronic message into an air conditioning communication electronic message, and then sends the air conditioning communication electronic message to the air conditioner 2 (to the destination) via the dedicated communication line 5.

The data manager 120 manages communication setting data 150 to be used for communications via the dedicated communication line 5 and the wireless communication network 6. The communication setting data 150 includes a dedicated communication local address 151, a wireless communication local address 152, and an air conditioning management apparatus address 153.

The dedicated communication local address 151 is its own address that is assigned in the dedicated communication line 5 connected to the wireless terminal 4. That is to say, the dedicated communication local address 151 is used in communicating with the air conditioners 2 via the dedicated communication line 5.

The wireless communication local address 152 is its own address that is assigned in the wireless communication network 6. That is to say, the wireless communication local address 152 is used in communicating with the air conditioning management apparatus 3 via the wireless communication network 6. The wireless communication local address 152 may also be used in communicating with other wireless terminals 4 via the wireless communication network 6.

The air conditioning management apparatus address 153 is an address of the air conditioning management apparatus 3 that is to be communicated via the wireless communication network 6. That is to say, the air conditioning management apparatus address 153 is used in communicating with the air conditioning management apparatus 3 via the wireless communication network 6.

The air conditioner communication manager 130 is an interface for the dedicated communication line 5. The controller 110 controls the air conditioner communication manager 130 to send and receive data (an air conditioning communication electronic message) to and from the air conditioners 2 of the external air conditioner group 8 via the dedicated communication line 5.

The wireless communication manager 140 is an interface for the wireless communication network 6. The controller 110 controls the wireless communication manager 140 to send and receive data (a wireless communication electronic message) to and from the air conditioning management apparatus 3 via the wireless communication network 6.

Figure 4:
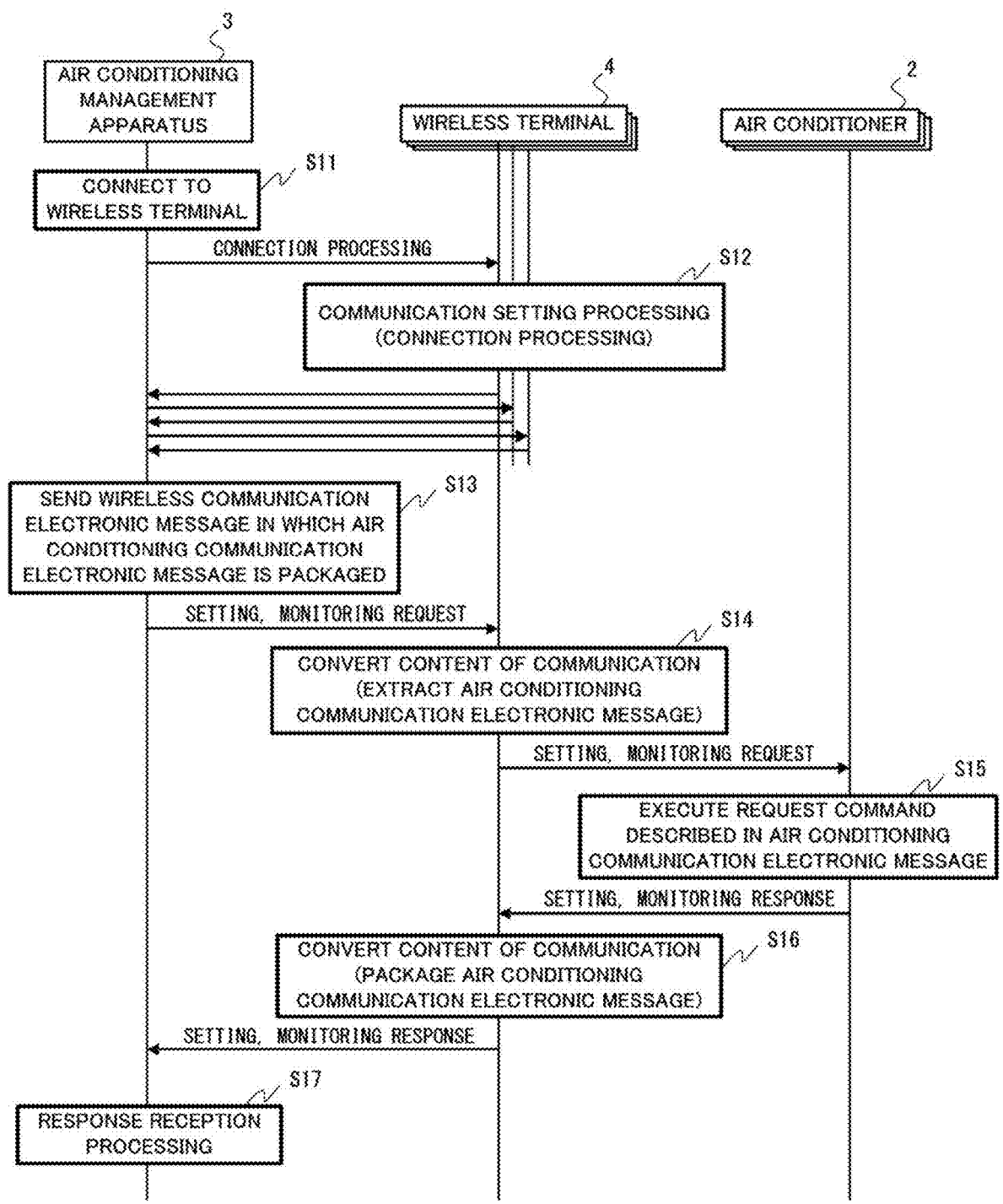
FIG. 4 illustrates a sequence of processing in sending from the air conditioning management apparatus to an air conditioner a request command used for setting and monitoring.
Figure 5:
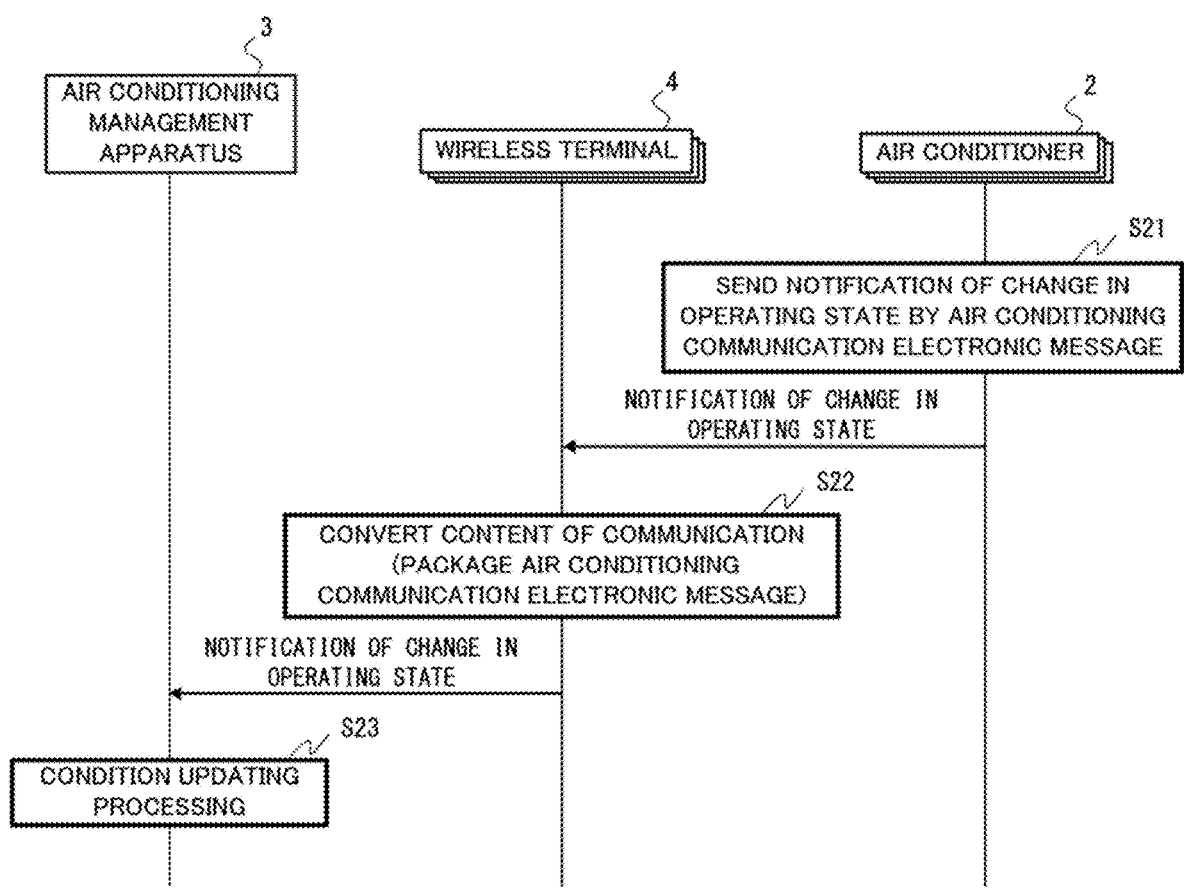
FIG. 5 illustrates a sequence of processing to send notification of a change in operating state of the air conditioner from the air conditioner to the air conditioning management apparatus.

Operation of the air conditioning system 1 having such configuration is described below with reference to FIGS. 4 and 5. FIG. 4 illustrates a sequence of processing in sending from the air conditioning management apparatus 3 to the air conditioners 2 of the external air conditioner group 8 a request command used for setting and monitoring. FIG. 5 illustrates a sequence of processing to send, from each of the air conditioners 2 of the external air conditioner group 8 to the air conditioning management apparatus 3, notification of a change in the operating state.

First, a sequence of processing starting from the air conditioning management apparatus 3 is described with reference to FIG. 4. The sequence of processing is also executed in, for example, performing startup of the air conditioning management apparatus 3.

Upon startup of the air conditioning management apparatus 3, the controller 30 of the air conditioning management apparatus 3 starts to connect to the wireless terminal 4 (step S11). That is to say, the external air conditioner manager 32 of the controller 30 reads the wireless terminal address list 103 from the data manager 40, and then starts connection processing for connection with the wireless terminal 4 corresponding to an IP address listed in the wireless terminal address list 103.

The controller 110 of the wireless terminal 4 performs communication setting processing in response to the connection processing from the air conditioning management apparatus 3 (step S12). For example, the controller 110 stores in the dedicated communication local address 151 of the data manager 120 the local communication address of the controller 110 used for communication with the air conditioners 2. The dedicated communication local address 151 may be stored in advance, instead of at this timing, in the data manager 120. The controller 110 stores the address of the air conditioning management apparatus 3 that is a connection source in the air conditioning management apparatus address 153 of the data manager 120.

Next, the air conditioning management apparatus 3 sends to the wireless terminal 4 a wireless communication electronic message in which an air conditioning communication electronic message is packaged (step S13). That is to say, the external air conditioner manager 32 reads from the data manager 40 the external air conditioning setting data 102 of the system configuration data 100, and then creates an air conditioning communication electronic message that describes request commands (in this case, various setting commands to be used for startup of the system of the external air conditioner group 8). The air conditioning communication electronic message created by the external air conditioner manager 32 includes a communication header in which a source address and a destination address on the dedicated communication line 5 are set. Thus, as described below, the wireless terminal 4 is not required to process the air conditioning communication electronic message at all. The external air conditioner manager 32 sends, after packaging the created air conditioning communication electronic message in the wireless communication electronic message, the wireless communication electronic message to the wireless terminal 4.

Upon receipt of the wireless communication electronic message, the wireless terminal 4 converts the content of the communication (step S14). That is to say, the communication converter 111 of the controller 110 extracts the air conditioning communication electronic message from the wireless communication electronic message received. This air conditioning communication electronic message includes, as described above, the communication header in which a source address and a destination address on the dedicated communication line 5 are set. Thus, the communication converter 111 sends the extracted air conditioning communication electronic message as is to the dedicated communication line 5, thereby enabling the air conditioning communication electronic message to be sent to the air conditioner 2 corresponding to the destination address.

Upon receipt of the air conditioning communication electronic message, the air conditioner 2 executes the request commands described in the air conditioning communication electronic message (step S15). That is to say, the air conditioner 2 analyzes the air conditioning communication electronic message received, and when the request command is a command for setting, executes a control corresponding to the setting, and when the request command is a command for monitoring, acquires a status value requested. Then, the air conditioner 2 creates an air conditioning communication electronic message that describes a response command for responding to the request command, and sends the air conditioning communication electronic message created to the wireless terminal 4.

Upon receipt of the air conditioning communication electronic message, the wireless terminal 4 converts the content of the communication (step S16). That is to say, the communication converter 111 creates a wireless communication message in which the received air conditioning communication electronic message is packaged, and sends the created wireless communication electronic message to the air conditioning management apparatus 3.

Upon receipt of the wireless communication electronic message, the air conditioning management apparatus 3 executes response reception processing (step S17). That is to say, the external air conditioner manager 32 extracts the air conditioning communication electronic message from the received wireless communication electronic message, and processes the response from the air conditioner 2. In the case of the response described in the air conditioning communication electronic message being a setting completion response or a monitor response, for example, the external air conditioner manager 32 stores the current operating state responded in the operating state 81 of the external air conditioner data 80 of the data manager 40.

The startup of the system of the external air conditioner group 8 is completed by repeating such a sequence of processing. After the completion of the startup, various operations (controls) and monitoring from the air conditioning management apparatus 3 with respect to the air conditioner 2 can be achieved by following a similar process.

Next, a sequence of processing starting from the air conditioner 2 of the external air conditioner group 8 is described with reference to FIG. 5. The sequence of processing is executed after the startup of the system in the external air conditioner group 8 is completed by executing the above-described sequence of processing illustrated in FIG. 4.

Upon occurrence of a change in the operating state of the air conditioner 2 of the external air conditioner group 8, the air conditioner 2 sends notification of the change in the operating state using an air conditioning communication electronic message (step S21). That is to say, the air conditioner 2 creates an air conditioning communication electronic message that describes a notification command providing notification of the change in the operating state, and sends the created air conditioning communication electronic message to the wireless terminal 4.

Upon receipt of the air conditioning communication electronic message, the controller 110 of the wireless terminal 4 converts the content of the communication (step S22). That is to say, communication converter 111 of the controller 110 creates a wireless communication electronic message in which the received air conditioning communication electronic message is packaged, and sends the created wireless communication electronic message to the air conditioning management apparatus 3.

Upon receipt of the wireless communication electronic message, the controller 30 of the air conditioning management apparatus 3 executes condition update processing (step S23). That is to say, the external air conditioner manager 32 of the controller 30 extracts from the received wireless communication electronic message the air conditioning communication electronic message, and updates the operating state of the air conditioner 2 to correspond to the change in the notification from the air conditioner 2. In the case of the change being a change in the operating state, for example, the external air conditioner manager 32 stores the notified current operating state in the operating state 81 of the external air conditioner data 80 of the data manager 40.

Such a sequence of processing executed among the air conditioning management apparatus 3 and each of the air conditioners 2 of the external air conditioner group 8 enables the air conditioning management apparatus 3 to save current operating state of each of the air conditioners 2.

Figure 6:
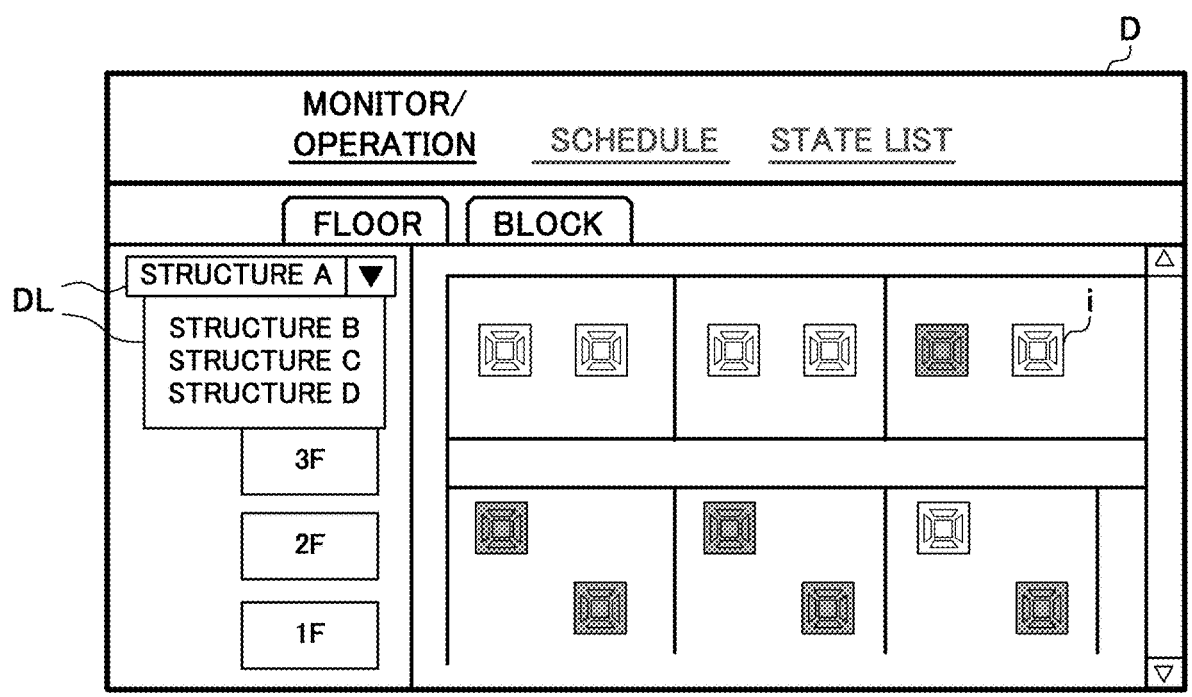
FIG. 6 illustrates an example of a monitor screen displayed by the air conditioning management apparatus.

Next, examples of a screen displayed on the display 10 of the air conditioning management apparatus 3 are described with reference to FIG. 6. FIG. 6 illustrates an example of a monitor screen D displayed by the air conditioning management apparatus 3. The monitor screen D, which is displayed when structure A is selected in a dropdown list DL, is a screen for monitoring the air conditioner group 7 connected to the dedicated communication line 5 of a structure in which the air conditioning management apparatus 3 is installed. When any of the structures B, C and D is selected in the dropdown list DL, a screen for monitoring the external air conditioner group 8 that is connected to the dedicated communication line 5 corresponding to a remotely located structure to which the air conditioning management apparatus 3 is connected via the wireless communication network 6 is displayed.

In accordance with the structure position data 91, the floor plan 92, and the display position data 93 that are saved in the data manager 40 of the air conditioning management apparatus 3, air conditioner icons i, each indicating the corresponding air conditioner 2, are displayed on the image of a floor plan of the monitor screen D. The air conditioner icons i each indicates the state of the corresponding air conditioner 2, and the state is constantly updated in accordance with the operating state 71 and the operating state 81 that are current operating states acquired respectively from the air conditioner group 7 and external air conditioner group 8 and saved in the data manager 40.

Although the example of the monitor screen D illustrates a case of displaying the air conditioner group 7 and each external air conditioner group 8 separately according to the structure in which they are installed, when the air conditioner group 7 and the external air conditioner groups 8 are separately installed in different floors of the same structure, the air conditioner group 7 and each external air conditioner group 8 may be separately displayed according to the floor in which they are installed.

As described above, the air conditioning system 1 includes the wireless terminals 4 that are connected to the corresponding dedicated communication line 5 connected to the air conditioners 2, and the air conditioning management apparatus 3 that communicates with the wireless terminal 4 via the wireless communication network 6. Such configuration eliminates the need in the conventional air conditioning systems for connecting directly the air conditioning management apparatus 3 with the air conditioners 2 via the dedicated communication line 5, and also eliminates the need for preparing a plurality of air conditioning management apparatuses 3 according to the number of the dedicated communication lines 5. Furthermore, limiting the function of each of the wireless terminals 4 to interconversion of communication via the corresponding dedicated communication line 5 and communication via the wireless communication network 6 enables restraint of the price of the terminal as compared to the conventional data collectors.

Such configuration enables collective management of the air conditioners 2 in the system while curbing increase in installation cost.

Other Embodiments

In the aforementioned Embodiment 1, a case is described in which the communication converter 111 of the controller 110 of the wireless terminal 4 packages an air conditioning communication electronic message received from the air conditioners 2 in a wireless communication electronic message, and extracts an air conditioning communication electronic message from a wireless communication electronic message received from the air conditioning management apparatus 3. In some embodiments, interconversion of an air conditioning communication electronic message and a wireless communication electronic message is not limited to such a manner and can be changed appropriately. For example, a conversion using a filter with relatively low processing load may be performed to convert a wireless communication electronic message into an air conditioning communication electronic message and to convert an air conditioning communication electronic message into a wireless communication electronic message.

In the aforementioned Embodiment 1, a case is described in which the air conditioning management apparatus 3 includes the display 10 and the inputter 20. In some embodiments, the air conditioning management apparatus 3 may have a configuration in which the display 10 and the inputter 20 are omitted. In this case, for example, an external management personal computer and the LAN communication manager 61 of the air conditioning management apparatus 3 are connected via the LAN communication line 9. The management personal computer displays on a display thereof (for example, a web browser screen) the aforementioned monitor screen D of FIG. 6, thereby enabling management of the air conditioners 2 in a similar manner.

Further, although a communication format used for the communication among the wireless terminals 4 and the air conditioning management apparatus 3 is not particularly specified in the aforementioned Embodiment 1, the communication format may be another format, such as a text format using Extensible Markup Language (XML) or the like, or a binary format to reduce communication size. Encryption of the communication may be performed to conceal the communication information.

In the aforementioned Embodiment 1, an example of the air conditioning system 1 for management of the plurality of the air conditioners 2 of the air conditioner group 7 and the external air conditioner group 8 is described. In some embodiments, devices to be managed are not limited to the air conditioners 2 and may be changed appropriately. For example, such a system is also applicable for cases in which management of facility equipment such as lighting equipment and hot water supply equipment is to be performed.

In the aforementioned Embodiment 1, a case is described in which the air conditioning management apparatus 3 and the wireless terminals 4 are directly connected. In some embodiments, the air conditioning management apparatus 3 and the wireless terminals 4 may be indirectly connected through another wireless terminal 4. For example, a mesh network with a plurality of the wireless terminals 4 may be constructed to enable communication among the air conditioning management apparatus 3 and a wireless terminal 4 through another wireless terminal 4 when status of communication is bad for the communication line that directly connects the air conditioning management apparatus 3 and a wireless terminal 4. Communication among the air conditioning management apparatus 3 and a wireless terminal 4 located distant from each other may be achieved by extending communication distance thorough the other wireless terminal 4.

In the aforementioned Embodiment 1, the air conditioning management apparatus 3 and the wireless terminals 4 are connected using a long-range wireless network. In some embodiments, the air conditioning management apparatus 3 and the wireless terminals 4 may be connected using wired communication lines other than a long-range wireless network, such as LAN.

In the aforementioned Embodiment 1, positional information (structure position data 91) of a structure in which the wireless terminal 4 is installed is used. In some embodiments, the positional information may be manually input from map information, or may be automatically collected by a wireless terminal 4 having a position detecting device such as GPS.

In the aforementioned Embodiment 1, a destination address is to be set to the wireless terminal 4 to send notification of a change in state from the air conditioner 2 of the external air conditioner group 8 to the air conditioning management apparatus 3. In some embodiments, the air conditioning management apparatus 3 and the wireless terminals 4 may be continuously connected by employing WebSocket or LongPolling to eliminate the need for setting a destination address and to enable prompt monitoring of operating state of the external air conditioner group 8 even in the case of use of numerous wireless terminals 4.

As described in detail above, the air conditioning system 1 according to Embodiment 1 includes the wireless terminals 4 that are connected to the dedicated communication line 5 connected to the air conditioners 2, and the air conditioning management apparatus 3 that communicates with the wireless terminal 4 via the wireless communication network 6. Such configuration eliminates the need in the conventional air conditioning systems for connecting directly the air conditioning management apparatus 3 with the air conditioners 2 via the dedicated communication line 5, and also eliminates the need for preparing a plurality of air conditioning management apparatuses 3 according to the number of the dedicated communication lines 5. Furthermore, limiting the function of the wireless terminal 4 to interconversion of communication via the dedicated communication line 5 and communication via the wireless communication network 6 enables restraint of the price of the terminal as compared to the conventional data collectors. Such configuration enables collective management of the air conditioners 2 in the system while curbing increase in installation cost.

Moreover, the air conditioning system 1 according to Embodiment 1 enables connection of the air conditioning management apparatus 3 with the air conditioners 2 of a plurality of the external air conditioner groups 8 that are arranged in a location including structures located remotely from one another, such as a plant, a school, and railway signal room. Such configuration eliminates the restriction in the conventional air conditioning systems that the number of the air conditioners 2 that can be managed is limited to the upper limit of the number of the air conditioners 2 connectable to the dedicated communication line 5, thereby enabling a great increase in the number of the air conditioners 2 that can be managed.

Moreover, the air conditioning system 1 according to Embodiment 1 enables a reduction in the number of the air conditioning management apparatuses 3 that is to be installed in the system to a single apparatus, thereby enabling a reduction of installation space.

Moreover, the air conditioning system 1 according to Embodiment 1 enables wireless communication among structures, thereby reducing the cost at the time of construction.

The foregoing describes some example embodiments for explanatory purposes. Although the foregoing discussion has presented specific embodiments, persons skilled in the art will recognize that changes may be made in form and detail without departing from the broader spirit and scope of the invention. Accordingly, the specification and drawings are to be regarded in an illustrative rather than a restrictive sense. This detailed description, therefore, is not to be taken in a limiting sense, and the scope of the invention is defined only by the included claims, along with the full range of equivalents to which such claims are entitled.

INDUSTRIAL APPLICABILITY

The present disclosure can be suitably used for an air conditioning system and a communication method that enable collective management of air conditioners installed in the system.

REFERENCE SIGNS LIST

1 Air conditioning system
2 Air conditioner
3 Air conditioning management apparatus
4 Wireless terminal
5 Dedicated communication line
6 Wireless communication network
7 Air conditioner group
8 External air conditioner group
9 LAN communication line
10 Display
20 Inputter
30, 110 Controller
31 Air conditioner manager
32 External air conditioner manager
40, 120 Data manager
50, 130 Air conditioner communication manager
60, 140 Wireless communication manager
61 LAN communication manager
70 Air conditioner data
71, 81 Operating state
72, 82 Function setting data
80 External air conditioner data
90 Screen display data
91 Structure position data
92 Floor plan
93 Display position data
100 System configuration data
101 Air conditioning setting data
102 External air conditioning setting data
103 Wireless terminal address list
111 Communication converter
150 Communication setting data
151 Dedicated communication local address
152 Wireless communication local address
153 Air conditioning management apparatus address

The invention claimed is:

1. An air conditioning system comprising:
an air conditioner connected to a wired transmission line;
a wireless terminal connected to the wired transmission line; and
an air conditioning management apparatus configured to control the air conditioner, wherein
the air conditioner sends and receives, on the wired transmission line, air conditioning communication electronic messages in a first electronic message format for a wired communication respectively to and from the wireless terminal, wherein the first electronic message format includes a communication header and a command, the communication header specifying source and destination addresses on the wired transmission line, the command being a request command to the air conditioner or a response to the request command, and
the air conditioner executes control corresponding to the request commands in the air conditioning communication electronic messages upon receipt thereof,
the wireless terminal comprises a wireless terminal processor programmed to
send and receive, on the wired transmission line, the air conditioning communication electronic messages in the first electronic message format respectively to and from the air conditioner,
package received air conditioning communication electronic messages in the first electronic message format into wireless communication electronic messages in a second electronic message format for a wireless communication, and
wirelessly send and receive wireless communication electronic messages in the second electronic message format respectively to and from the air conditioning management apparatus, and
the air conditioning management apparatus comprises an air conditioning management apparatus processor programmed to
responsive to receipt of the wireless communication electronic messages, extract the air conditioning communication electronic messages in the first electronic message format from the wireless communication electronic messages in the second electronic message format, and
create the air conditioning communication electronic messages which are in the first electronic message format that are to be sent to the air conditioner, package the air conditioning communication electronic messages into the wireless communication electronic messages which are in the second electronic message format to be sent to the wireless terminal, and then send the wireless communication electronic messages in the second electronic message format to the wireless terminal.

2. The air conditioning system according to claim 1, wherein
the wireless terminal processor is further configured to extract the air conditioning communication electronic messages in the first electronic message format packaged in the wireless communication electronic messages which are in the second electronic message format received via a wireless transmission line, and send the air conditioning communication electronic messages in the first electronic message format to the air conditioner via the wired transmission line.

3. The air conditioning system according to claim 1, wherein
the air conditioning management apparatus processor is further configured to perform, in a process of sending and receiving information of the wireless communication electronic messages which are in the second electronic message format respectively to and from the wireless terminal, setting to be used for communication with the air conditioner through the wireless terminal.

4. A communication method in an air conditioning system including an air conditioner that executes control corresponding to request commands in air conditioning communication electronic messages upon receipt thereof, the air condition being connected to a wired transmission line, a wireless terminal connected to the wired transmission line, and an air conditioning management apparatus configured to control the air conditioner,
the method comprising:
a wired communication step of sending and receiving, by the air conditioner, on the wired transmission line, air conditioning communication electronic messages in a first electronic message format for a wired communication respectively to and from the wireless terminal, wherein the first electronic message format includes a communication header and a command, the communication header specifying source and destination addresses on the wired transmission line, the command being a request command to the air conditioner which executes control corresponding to the request command or a response to the request command;
a conversion step of
sending and receiving, by the wireless terminal, on the wired transmission line, the air conditioning communication electronic messages in the first electronic message format respectively to and from the air conditioner,
packaging, by the wireless terminal, received air conditioning communication electronic messages in the first electronic message format into wireless communication electronic messages in a second electronic message format for a wireless communication, and
wirelessly sending and receiving, by the wireless terminal, the wireless communication electronic messages in the second electronic message format respectively to and from the air conditioning management apparatus; and
a wireless communication step of
extracting, by the air conditioning management apparatus, responsive to receipt of the wireless communication electronic messages, the air conditioning communication electronic messages in the first electronic message format from the wireless communication electronic messages in the second electronic message format, and
creating, by the air conditioning management apparatus, the air conditioning communication electronic messages which are in the first electronic message format that are to be sent to the air conditioner, packaging the air conditioning communication electronic messages into the wireless communication electronic messages which are in the second electronic message format to be sent to the wireless terminal, and then sending, by the air conditioning management apparatus, the wireless communication electronic messages in the second electronic message format to the wireless terminal.

5. The communication method according to claim 4, further comprising, by the wireless terminal
extracting the air conditioning communication electronic messages in the first electronic message format packaged in the wireless communication electronic messages which are in the second electronic message format received via a wireless transmission line, and sending the air conditioning communication electronic messages in the first electronic message format to the air conditioner via the wired transmission line.

6. The communication method according to claim 4, further comprising, by the air conditioning management apparatus, performing, in a process of sending and receiving information of the wireless communication electronic messages which are in the second electronic message respectively to and from the wireless terminal, setting to be used for communication with the air conditioner through the wireless terminal.

\* \* \* \* \*